Feb. 15, 1949.　　　　O. M. WHITTEN　　　　2,462,015
BOOSTER BRAKE MECHANISM
Filed July 14, 1945
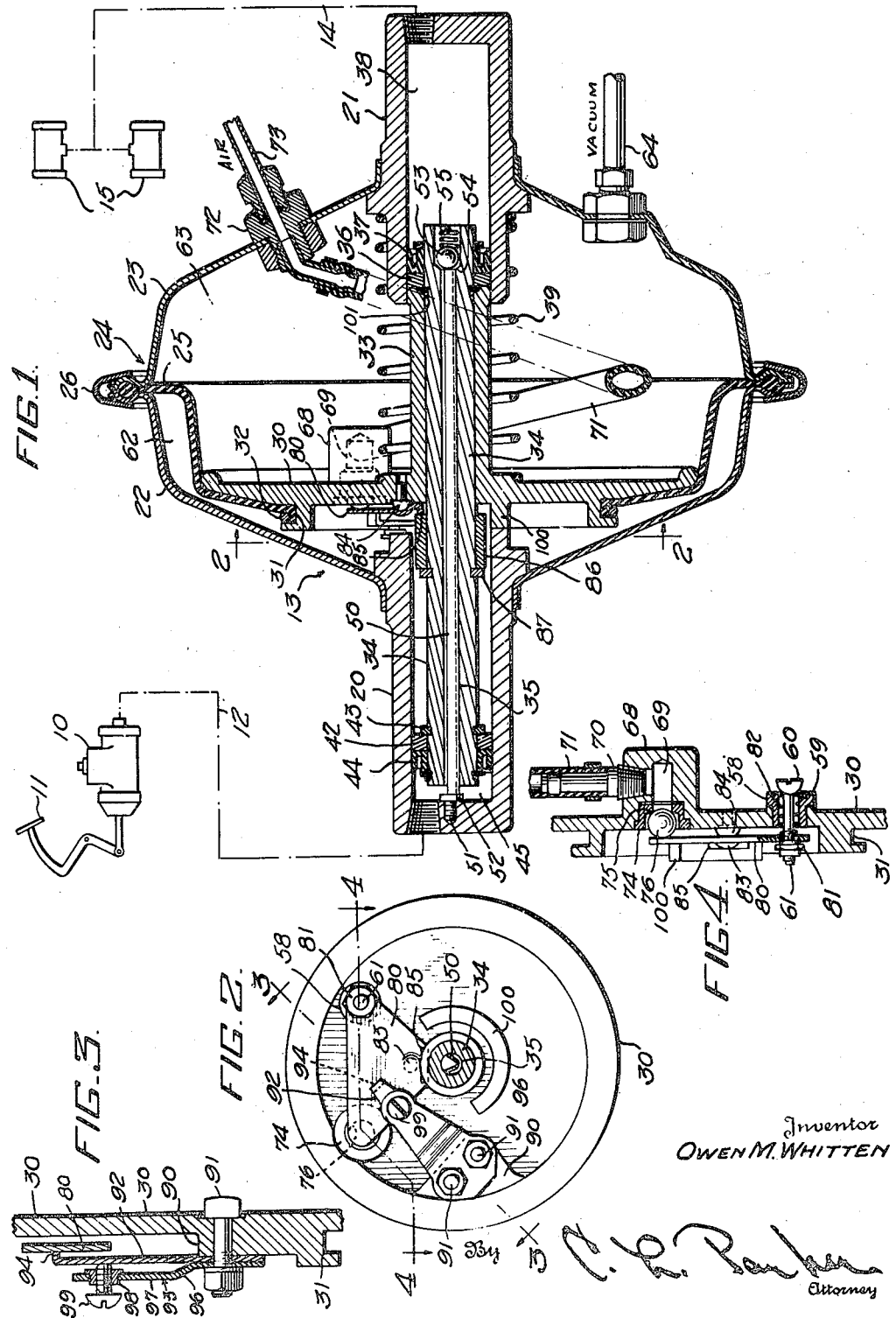
Inventor
OWEN M. WHITTEN Patented Feb. 15, 1949

2,462,015

UNITED STATES PATENT OFFICE 2,462,015

BOOSTER BRAKE MECHANISM

Owen M. Whitten, Detroit, Mich., assignor to Empire Electric Brake Company, Newark, N. J., a corporation of New Jersey Application July 14, 1945, Serial No. 605,119

7 Claims. (Cl. 121—41)

This invention relates to hydraulic booster brake mechanisms, and more particularly to a fluid pressure operated motor for such mechanisms.

Several types of booster brake mechanisms have been developed wherein fluid displaced from the vehicle master cylinder operates a valve mechanism to energize a fluid pressure operated motor to generate, or assist in generating, the desired pressures in the brake cylinders of a vehicle. Such devices ordinarily utilize the displacement of fluid from the master cylinder to assist the motor in generating pressure to perform part of the work in applying the brakes. Such a brake mechanism is disclosed in the patent to Rudolph J. Klimkiewicz, No. 2,377,699, granted June 5, 1945.

In the structure disclosed in the Klimkiewicz patent, the fluid pressure operated motor is controlled by a pair of valves, one of which controls communication between the two motor chambers and is normally open, and the other of which controls communication between one motor chamber and a source of relatively high pressure and is normally closed. The normal positions of the valves are effected by means of springs, and a lever is operable by a plunger movable by fluid displaced from the master cylinder to close the normally open valve and then open the other or higher pressure valve to energize the motor.

In prior devices of this type, it is desirable to simplify the lever mechanism as much as possible, and to seat the higher pressure valve through the operation of a spring acting against the lever and seating such valve against pressure in the source. This avoids the necessity for applying through the lever a force to open the higher pressure valve which must exceed the air pressure tending to seat the valve plus the pressure of the valve spring also tending to seat it, the building up of this force providing a "blind" space in the operation of the valve mechanism and causing a so-called "lumpy" operation.

The elimination of such "lumpy" operation is highly desirable in a passenger vehicle in order that a smoothly progressive application of pressure to the foot pedal will effect a smoothly progressive building up of braking pressure in the high pressure chamber of the booster mechanism. A device particularly well suited for this purpose is disclosed in the copending application of Jeannot G. Ingres, Serial No. 590,233, filed April 25, 1945, now Patent No. 2,448,981. However, various brake mechanisms involve different operating characteristics and in some installations it is desirable to somewhat increase the force necessary to open the high pressure valve to energize the booster motor, this being particularly true in heavier vehicles such as trucks and buses, and varies somewhat in accordance with the individual ideas of manufacturers.

An important object of the present invention is to provide a simple control valve mechanism for a fluid pressure motor, and particularly a brake booster motor, which involves all of the advantages of the structure of the copending application referred to, with relation to the valve operating lever and the spring biasing means therefor, and particularly to provide a single valve operating mechanism wherein the loading of the valve operating lever tending to seat the higher pressure valve may be varied within substantial limits, thus permitting a single booster structure to be installed on different types of vehicles and to operate in accordance with the manufacturers' individual ideas.

A further object is to provide a device of the character referred to wherein the spring device for the valve controlling lever is formed of a main spring and a back-up spring, the latter having means associated therewith to vary the total spring loading of the valve controlling lever.

A further object is to provide an apparatus of the character referred to employing a pair of leaf springs in cooperative relationship, functioning to determine the total spring loading of the valve controlling plate and provided with means for adjusting the loading of the back-up spring to control the total pressure tending to seat the higher pressure valve, to thus determine the master cylinder pressure at which such valve will be released for opening movement.

Other objects and advantages of the invention will become apparent from the course of the following description.

In the drawing I have shown one embodiment of the invention. In this showing,

Figure 1 is an axial sectional view through the booster motor unit, shown in conjunction with a vehicle braking system, the master cylinder and wheel cylinders of the latter being diagrammatically represented, Figure 2 is a sectional view on line 2—2 of Figure 1, the casing and portions of other elements being omitted, Figure 3 is a detail sectional view on line 3—3 of Figure 2, and Figure 4 is a similar view on line 4—4 of Figure 2.

Referring to Figure 1, the numeral 10 designates a conventional master cylinder of a motor vehicle having a conventional piston (not shown) mounted therein and operable by a pedal 11 to displace fluid from the master cylinder through a conduit 12. Fluid displaced through the conduit 12 controls the functioning of a booster mechanism indicated as a whole by the numeral 13, and fluid from the booster, in a manner to be described, is displaced through the conduit 14 to the vehicle wheel cylinders, two of which are illustrated in Figure 1 and indicated by the numeral 15.

The booster mechanism comprises what may be termed a low pressure cylinder 20 and a high pressure cylinder 21, and these cylinders carry the respective casing sections 22 and 23 of a pressure operated motor indicated as a whole by the numeral 24. The casing sections 22 and 23 are dished as shown in Figure 1 and are so arranged that their peripheral edges receive therebetween the periphery of a flexible diaphragm 25, th casing sections being clamped with respect to each other and with respect to the diaphragm 25 by a suitable clamping ring 26.

The motor further comprises a diaphragm plate 30 having an annular groove 31 receiving the inner periphery of the diaphragm 25 to be held in position by a clamping ring 32. The diaphragm plate 30 carries a tubular piston 33, one end of which enters the cylinder 21 as shown in Figure 1. An inner plunger 34 is axially slidable in the piston 33 and is provided with an axial passage 35 therethrough. The plunger 34 projects into the cylinder 21 and is surrounded by a ring 36 engageable and operable by the piston 33. A sealing cup 37 seats against the ring 36 between the wall of the cylinder 21 and the plunger 34. The interior of the cylinder 21 forms a high pressure chamber 38 communicating with the conduit 14. Movement of either the plunger 34 or the piston 33, or both, effects a generation of pressure in the chamber 38 in a manner to be described. The parts are shown in their "off" position in Figure 1, and a spring 39 urges the piston 33 and the elements connected thereto to such "off" position.

The plunger 34 extends substantially through the cylinder 20 and is provided with a ring 42, backed up by a snap ring 43 and engaging a sealing ring 44. This sealing ring and the adjacent end of the plunger 34 define with the cylinder 20 a low pressure chamber 45 with which the conduit 12 communicates.

A rod 50 extends through the axial opening 35 and engages a screw 52 tapped as at 51 into the outer end of the cylinder 20. The opposite end of the rod 50 engages a ball 53 to hold it from its seat 54, the ball being urged toward its seat by a light coil spring 55. When the parts are in the "off" position, therefore, the ball 53 is unseated to afford communication between the chambers 45 and 38 for reasons to be referred to later.

The diaphragm plate 30 is provided with a tubular thimble 58 inserted therethrough as shown in Figure 4, the inner end of this thimble forming a valve seat 59 engageable by a valve 60 carried by a stem 61 and referred to more in detail later. When the parts are in their "off" positions, the valve 60 is unseated, thus affording communication between the motor chambers 62 and 63 within the respective casing sections 22 and 23. The chamber 23, in the embodiment of the invention illustrated, is in fixed communication through a pipe 64 with a source of vacuum such as the intake manifold of a motor vehicle engine. The valve 60 is open under the conditions referred to, and vacuum conditions will exist in both motor chambers 62 and 63 as will be more apparent later.

The diaphragm plate 30 is further provided with a boss 68 (Figures 1 and 4) having a passage 69 therein communicating through a coupling 70 with a flexible hose 71, this hose being spiraled within the motor chamber 63 and connected through a suitable union 72 to an air pipe 73 preferably provided with an air cleaner (not shown). A thimble 74 is recessed into the diaphragm plate 30 for communication with the passage 69 and is provided with a valve seat 75 normally engaged by a ball valve 76. This valve controls communication between the atmosphere and the motor chamber 62, and since it is closed when the parts are in their "off" positions, the opening of the valve 60 under such conditions maintains a vacuum in each of the motor chambers 62 and 63.

A lever 80 is adapted to control operation of the valves 60 and 76. The lever 80 is triangular in form and has one of its corners directly engaging the ball 76 as shown in Figure 4. A second corner of the lever 80 is apertured for the extension of the valve stem 61 therethrough (Figure 4) and a nut 81 is threaded on the valve stem 61 so that movement of the associated corner of the lever 80 away from the diaphragm plate 30 will seat the valve 60. A light coil spring 82 surrounds the valve stem 61 between the valve 60 and lever 80 to urge the valve away from the lever while at the same time allowing the valve 60 and its stem to swing with respect to the lever 80 to seat accurately, the base of the nut 81 being a section of a sphere so as to provide for rocking movement of the valve stem 61.

Adjacent its third corner, the lever 80 is provided with a spiral stamped portion 83 to form a similarly shaped recess to receive the round head 84 of a fulcrum pin carried by the diaphragm plate 30. It will be apparent that this pin provides a universal fulcrum for the lever, the latter being pivotable on either of two lines, one extending through the head of the pin 84 and the ball 76 and the other passing through the head of the pin 84 and the point of contact of the nut 81 with the lever 80.

Beneath the stamped portion 83, the third corner of the lever 80 is provided with a projecting flange 85 engageable with the adjacent end of a sleeve 86 carried by the plunger 84 and fixed against movement in one direction with respect thereto by a snap ring 87.

A novel spring device urges the upper end portion of the lever 80 toward the right as viewed in Figures 1, 3 and 4 to tend to seat the ball 76 and unseat the valve 60, most of the spring force being exerted closer to the ball 76 than to valve 60 in order that operation of the lever 80 in a manner to be described will first seat the valve 60 and then release the ball 76 to be opened by fluid presure thereneath. Referring to Figures 2 and 3, the numeral 90 designates a boss preferably cast integral with the diaphragm plate 30 and bolts 91 pass through the diaphragm plate to secure to the boss 90 a pair of spring elements 92 and 93. The spring element 92 may be made flat throughout substantially its entire length as shown in Figure 3 with its extremity adjacent the plate 80 turned inwardly to form a finger 94 engaging the lever 80. The spring element 93 has its bolted end lying directly on the spring element 92, and beyond the boss 90, is offset outwardly as at 96 to provide a portion 97 spaced from the spring element 92. Such spaced portion carries a thimble 98 in which is threaded a screw 99, the inner end of which contacts with the spring element 92 as shown in Figure 3.

The diaphragm plate 30 is further provided with an arcuate boss 100 (Figures 1 and 2) engageable against the inner end of the cylinder 20 to limit movement of the diaphragm plate and associated elements to their "off" positions, in which positions the valves 60 and 76 will be respectively open and closed, as stated.

As is customary in devices of this character, a small ring 101 is arranged between the ring 36 and the end of the plunger 33 and has lost motion engagement with the piston 34. This provides for manual operation of the apparatus in the event of a failure of power in the motor, and provides a positive connection through which movement of the parts to "off" position will be transmitted to the plunger 34.

The operation of the device is as follows:

Assuming that the operator desires to apply the brakes, the pedal 11 will be depressed to displace fluid from the cylinder 10 through the conduit 12 into the low pressure chamber 45. Fluid will flow through the passage 35 into the chamber 38, thence through conduit 14 into the brake cylinders 15 to move the brake shoes into initial contact with the brake drums. This operation requires substantial displacement of fluid but takes place with negligible resistance and accordingly can be readily effected directly by operation of the pedal 11 without energizing the motor 24. As soon as the brake shoes engage the drums, an increased static pressure will occur throughout the system and the area of the piston in the chamber 45 being greater than the area of the piston 34 exposed to pressure in the chamber 38, the piston 34 will start to move toward the right as viewed in Figure 1. The sleeve 86 will engage the lever lip 85 to rock the lever 80, and since the spring device has its contact finger 94 engaging the lever closer to the ball 76 than to the valve 60, the end of the lever adjacent the valve 60 will move first to seat such valve, the lever 80 rocking on the pivot axis defined by the head of the pin 84 and the point of contact between the lever 80 and ball valve 76.

The seating of the valve 60 disconnects the motor chambers 62 and 63. Since the seating of the valve 60 prevents further rocking movement of the lever 80 on the pivot axis referred to, further movement of the plunger 34 will rock the lever 80 on its second axis defined by the points of contact of the lever 80 with the head of the screw 84 and with the under side of the nut 81. The lever 80 will rock on the lever axis against the tension of the spring device to relieve pressure from the ball 76, and when this pressure is reduced below the pressure of the air in the passage 69 tending to unseat the ball 60, this ball will leave its seat and admit air into the motor chamber 62. Thus higher pressure will be built up in the motor chamber 62 than in the chamber 63, which remains in communication with the source of vacuum through pipe 64, and the diaphragm 25 and its plate 30 and plunger 33 will start to move toward the right in Figure 1. This movement coincides with movement of the piston 34 and the two cooperate to build up a braking pressure in the chamber 38 to apply the brakes. The increase in braking pressure will continue so long as fluid is displaced from the master cylinder to move the piston 34 to operate the valves in the manner stated. When the movement of the pedal 11 is arrested, very slight movement of the piston 33 and associated elements will relieve pressure between the sleeve 86 and the lever lip 85 whereby the spring device will seat the valve 76 and cut off the admission of air into the motor chamber 62. Any tendency for the piston 33 to overrun its exact position relative to the plunger 34 will result in the "cracking" of the valve 60 to exhaust some of the air from the motor chamber 62 to establish the exact differential pressure necessary to arrest movement of the reciprocating parts of the motor.

It will be understood, of course, that initial movement of the plunger 34 will have moved such element relative to the rod 50 in which case the ball 53 will have become seated to close communication between the pressure chambers 45 and 38. When the brake pedal 11 is released, the operation referred to will be reversed, pressure between the sleeve 86 and lever lip 85 being reduced to zero and the normal positions of the valves 60 and 76 being reestablished to close the motor chamber to the atmosphere and open it to the chamber 63 through valve 60. Air will be exhausted from the motor chamber 62 until pressures in the motor chambers are equalized, during which period the spring 39 will be moving through reciprocating motor parts back to their "off" positions. The latter positions will be reached with the boss 100 engaging the inner end of the cylinder 20. The rod 50 will again unseat the ball 53 to open the chamber 45 to the chamber 38 to replenish any leakage which may have occurred from the higher pressure end of the system. During the return movement of the parts, the pressure in the high pressure end of the system will urge the plunger 34 toward its off position, and if necessary, the ring 36 will impart movement to the piston 34 through the ring 101. The last increment of movement of the plunger 34 to its "off" position will be imparted by the operation of the spring device urging the upper end of the lever 80 as viewed in Figure 1 to the right while the lip 85 engages the sleeve 86 to move to the left.

Upon a failure of power in the motor, the slight play at the ring 101 will be taken up so that actuation of the plunger 34 will directly actuate the plunger 33 to provide for manual application of the brakes.

The spring device shown in Figures 2 and 3 constitutes the most important feature of the present invention. Under all conditions, the spring acting on the lever 80 must be sufficient in tension when the parts are in the "off" position to hold the valve 76 closed. The excess tension will be determined in accordance with individual installations and the ideas of individual manufacturers. The space provided for the spring means for the lever 80 is quite limited and it has been found impracticable in commercial production to provide a coil spring which will effect the maximum pressures desirable for tending to seat the valve 76. Where a spring similar to the spring 92 has been provided, it is necessary to manufacture springs of different tensions for different installations, whereas, as a practical matter for commercial production, it is highly desirable to make standard parts for all brake boosters of a given size. The present spring device permits the use of a simple standardized means whereby different "cut-in" pressures may be provided, that is, pressures necessary in the chamber 45 for releasing the air valve 76 for opening movement. Where relatively low "cut-in" pressures are desired, the screw 99 may be adjusted outwardly or to the left in Figure 3. If it is desirable in a given installation to increase the "cut-in" pressure, the screw 99 may be adjusted to the right to flex it away from the spring 92 and increase its tension to more greatly resist movement of the lever 80 to release the air valve. A single standardized construction of simple form and economical manufacture thus will provide for substantial variations in the ranges of "cut-in" pressures.

I claim:

1. A fluid pressure motor comprising a casing having a pressure-responsive unit therein, a pair of valves carried by said pressure responsive unit and operable for controlling pressures in opposite ends of said casing, a control lever for said valves, a single point bearing for said lever, said lever having mechanical engagement with said valves at points spaced from each other and from said bearing whereby said lever is rockable on either of a pair of axes in its own plane intersecting at said bearing, means for applying a force to said plate to tend to operate it to effect operation of both valves, resilient means carried by said pressure responsive unit and having mechanical engagement with said lever closer to one of said valves than to the other valve whereby operation of said lever will first move said other valve and then move said one valve, and means carried by said pressure unit for adjusting the loading of said resilient means to determine the force which must be applied to said lever to effect operation of said one valve after said other valve has been operated.

2. A fluid pressure motor comprising a casing having a pressure-responsive unit therein, a pair of valves carried by said pressure responsive unit and operable for controlling pressures in opposite ends of said casing, a control lever for said valves, a single point bearing for said lever, said lever having mechanical engagement with said valves at points spaced from each other and from said bearing whereby said lever is rockable on either of a pair of axes in its own plane intersecting at said bearing, a pressure chamber having a piston therein responsive to pressures built up in said chamber and having mechanical engagement with said lever at an end thereof on the opposite side of said lever from its points of engagement with said valves whereby movement of said plunger tends to move said lever on said bearing for operation of both valves, resilient means carried by said pressure responsive unit and engaging said lever closer to one valve than to the other valve whereby the latter will be operated upon movement of said plunger before movement of the point of engagement of said lever with said one valve, and means carried by said pressure responsive unit for adjusting the loading of said resilient means to determine the pressure in said pressure chamber necessary for moving said piston for operation of said one valve after said other valve has been operated.

3. A differential fluid pressure operated motor comprising a casing, a pressure movable unit therein comprising a plate, a pair of spaced valves carried by said plate, one of said valves being movable to closed position to close communication between opposite ends of said casing and the other valve being movable to open position to connect one end of said casing to a source of relatively high pressure, a lever mechanically engaging both valves, a single-point bearing engaging said plate radially inwardly of said valves, means radially inwardly of said bearing for rocking said lever thereon to tend to result in operation of both valves, resilient means engaging said lever to oppose movement of said other valve whereby said one valve will be closed prior to opening movement of said other valve, said resilient means being carried by the plate of said unit, and a device connected to said resilient means for varying the loading thereof.

4. A differential fluid pressure operated motor comprising a casing, a pressure movable unit therein comprising a plate, a pair of spaced valves carried by said plate, one of said valves being movable to closed position to close communication between opposite ends of said casing and the other valve being movable to open position to connect one end of said casing to a source of relatively high pressure, a lever mechanically engaging both valves, a single-point bearing engaging said plate radially inwardly of said valves, means radially inwardly of said bearing for rocking said lever thereon to tend to result in operation of both valves, resilient means engaging said lever to oppose movement of said other valve whereby said one valve will be closed prior to opening movement of said other valve, said resilient means comprising a pair of leaf springs one of which engages said lever, and adjustable means for transmitting the loading of the other leaf spring to said one leaf spring to adjust the force with which movement of said lever is opposed.

5. A differential fluid pressure operated motor comprising a casing, a pressure movable unit therein comprising a plate, a pair of spaced valves carried by said plate, one of said valves being movable to closed position to close communication between opposite ends of said casing and the other valve being movable to open position to connect one end of said casing to a source of relatively high pressure, a lever mechanically engaging both valves, a single-point bearing engaging said plate radially inwardly of said valves, means radially inwardly of said bearing for rocking said lever thereon to tend to result in operation of both valves, resilient means engaging said lever to oppose movement of said other valve whereby said one valve will be closed prior to opening movement of said other valve, said resilient means comprising a pair of leaf springs secured at one end to the plate of said unit, one of said springs being longer than the other and directly engaging said lever, the other of said springs being arranged to transmit force to said longer spring for transmission therethrough to said lever and having means associated therewith for varying the loading thereof.

6. A differential fluid pressure operated motor comprising a casing, a pressure movable unit therein comprising a plate, a pair of spaced valves carried by said plate, one of said valves being movable to closed position to close communication between opposite ends of said casing and the other valve being movable to open position to connect one end of said casing to a source of relatively high pressure, a lever mechanically engaging both valves, a single-point bearing engaging said plate radially inwardly of said valves, means radially inwardly of said bearing for rocking said lever thereon to tend to result in operation of both valves, resilient means engaging said lever to oppose movement of said other valve whereby said one valve will be closed prior to opening movement of said other valve, said resilient means comprising a pair of leaf springs secured at one end to the plate of said unit, one of said springs being longer than the other and directly engaging said lever, and an adjusting screw having threaded connection with the other leaf spring and engaging the longer leaf spring to transmit the force of said other leaf spring thereto.

7. A fluid pressure motor comprising a casing having a pressure-responsive unit therein, a pair of valves carried by said unit and operable for controlling pressures in opposite ends of said casing, a control lever for said valves, a single point bearing for said lever engaging said unit, said lever having mechanical engagement with said valves at points spaced from each other and from said bearing whereby said lever is rockable on either of a pair of axes in its own plane intersecting at said bearing, means for applying a force to said lever to tend to operate it to effect operation of both valves, a leaf spring fixed at one end to said unit and having its other end engaging said lever closer to one of said valves than to the other valve whereby operation of said lever will first move said other valve and then move said one valve, a second leaf spring fixed at one end to said unit, and adjustable means for transmitting force from the other end of said second leaf spring to said first named leaf spring to determine the force which must be applied to said lever to effect operation of said one valve after said other valve has been operated.

OWEN M. WHITTEN.

REFERENCES CITED

The following references are of record in the file of this patent:

UNITED STATES PATENTS

| Number | Name | Date |
| --- | --- | --- |
| 2,354,814 | Joesting | Aug. 1, 1944 |
| 2,377,699 | Klimkiewicz | June 5, 1945 |
| 2,383,682 | Price | Aug. 28, 1945 |